US006791999B1

(12) United States Patent
Budhraja et al.

(10) Patent No.: US 6,791,999 B1
(45) Date of Patent: Sep. 14, 2004

(54) SYSTEM AND METHOD FOR PROVIDING DYNAMIC SWITCHING FUNCTIONALITY IN A STATIC SWITCHING ENVIRONMENT

(75) Inventors: Virendra K. Budhraja, Petaluma, CA (US); Vinod K. Nair, Greenbrae, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/239,417

(22) Filed: Jan. 28, 1999

(51) Int. Cl.[7] ............................. H04J 3/16; H04J 3/17; H04Q 11/04; H04L 12/30; H04L 12/28
(52) U.S. Cl. ..................... 370/463; 370/434; 370/359; 370/360; 370/386; 370/420
(58) Field of Search .................................. 370/254, 255, 370/257, 261, 264, 270, 271, 312, 314, 321, 323, 325, 326, 337, 338, 347, 352, 356, 359, 360, 386, 395.3, 395.4, 420, 422, 468, 433–435, 419, 463, 485

(56) References Cited

U.S. PATENT DOCUMENTS

| | | | | |
|---|---|---|---|---|
| 5,355,362 A | * | 10/1994 | Gorshe et al. ............... | 370/222 |
| 5,594,727 A | | 1/1997 | Kolbenson et al. .......... | 370/442 |
| 5,923,646 A | | 7/1999 | Mandhyan ................... | 370/254 |
| 5,940,388 A | * | 8/1999 | Nahar et al. ................ | 370/359 |
| 5,953,318 A | * | 9/1999 | Nattkemper et al. ........ | 370/236 |
| 5,999,518 A | * | 12/1999 | Nattkemper et al. ........ | 370/258 |
| 6,049,550 A | * | 4/2000 | Baydar et al. ............... | 370/258 |
| 6,223,220 B1 | | 4/2001 | Blackwell et al. ........... | 709/223 |
| 6,229,800 B1 | * | 5/2001 | Thompson et al. .......... | 370/347 |
| 6,229,815 B1 | | 5/2001 | Huang et al. ................ | 370/437 |
| 6,289,097 B1 | * | 9/2001 | Gregory et al. ............. | 379/338 |
| 6,320,856 B1 | * | 11/2001 | Deschaine et al. .......... | 370/337 |
| 6,324,185 B1 | * | 11/2001 | Budhraja .................... | 370/466 |
| 6,330,005 B1 | | 12/2001 | Tonelli et al. ............... | 345/735 |
| 6,392,995 B1 | * | 5/2002 | Quinquis et al. ............ | 370/235 |
| 6,404,744 B1 | | 6/2002 | Saito .......................... | 370/255 |

OTHER PUBLICATIONS

Newton, Newton's Telecom Dictionary, Oct. 1998, Telecom Books, p. 731.*
"Digital Interface Between the SLC®96 Digital Loop Carrier System And A Local Digital Switch," Technical Reference TR–TSY–000008, Issue 2, Aug., 1987, Revision 1, Sep., 1993, Bellcore.

(List continued on next page.)

*Primary Examiner*—Seema S. Rao
*Assistant Examiner*—Ronald Abelson
(74) *Attorney, Agent, or Firm*—Baker Botts L.L.P.

(57) ABSTRACT

A system and method for providing dynamic switching functionality in an access network which supports only static switching. Dynamic switching is used to provide connections between a local digital switch and subscribers of the access network wherein the subscribers are connected to remote terminals which only support a static switching protocol. A dynamic switching subsystem is coupled to the local digital switch via a first communication link and coupled to the remote terminals using one or more second communication links. The remote terminals provide nailed up connections between the network terminations of the second communications links coupled to the remote terminals and the subscriber terminations connected to the subscribers. The dynamic switching subsystem provides dynamic switching between network terminations of the first communication link and network terminations of the second communication link. To facilitate dynamic switching, unique call reference values are assigned to the network terminations of the second communication link in the dynamic switching channel. The unique call reference values uniquely identify each of the communication channels of the second communication link from the dynamic switching subsystem to the remote terminals. The unique call reference values are used to provide dynamic connections between network terminations of the first communication link and network terminations of the second communication link in the dynamic switching subsystem.

8 Claims, 8 Drawing Sheets

OTHER PUBLICATIONS

"Functional Criteria for Digital Loop Carrier Systems," a Module of TSGR, FR–NWT–000440, Technical Reference TR–NWT–000057, Issue 2, Jan., 1993, *Bellcore*.

"Integrated Digital Loop Carrier System Generic Requirements, Objectives, and Interface," (A module of TSGR, FR–440), Generic Requirements GR–303–CORE, Issue 2, *Bellcore*, Dec., 1998.

"Integrated Digital Loop Carrier System Generic Requirements, Objectives, and Interface," (A module of TSGR, FR–440), Generic Requirements GR–303–CORE, Issue 1, Bellcore; pp. 1–1 through 1–14 and 2–1 through 2–8, Sep. 1995.

\* cited by examiner

SYSTEM AND METHOD FOR PROVIDING DYNAMIC SWITCHING FUNCTIONALITY IN A STATIC SWITCHING ENVIRONMENT

BACKGROUND OF THE INVENTION

The present invention relates to switching technology in a digital access network and more particularly to techniques for providing dynamic bandwidth switching functionality in an access network which supports only static or nailed up bandwidth switching.

The increasing demand for terminal user services has spurred rapid advances in the field of data communications. Initially, telecommunication services were provided to subscribers via individual copper wire lines connected between subscribers and the telephone exchanges. However, with the rapid increase in the number of subscribers, this approach soon became costly and unmanageable.

Figure 1A:
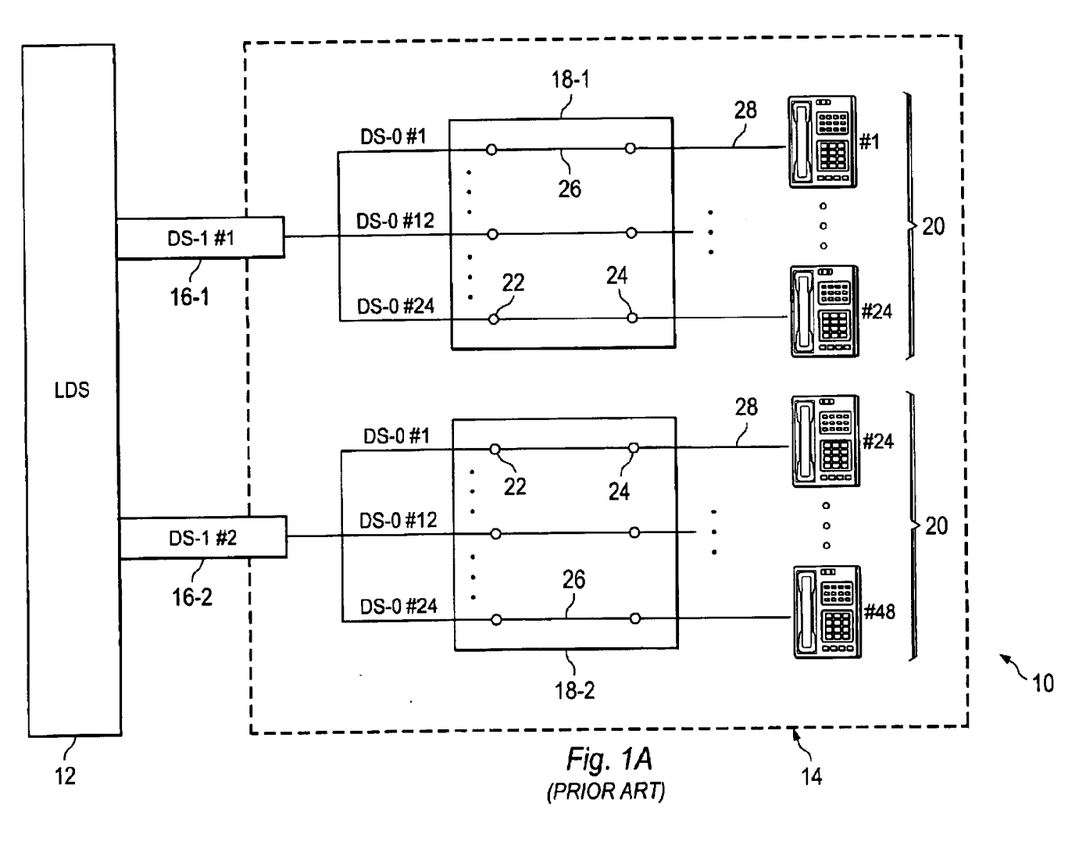
FIG. 1A depicts an access network which uses conventional static switching techniques to connect subscribers to a local digital switch.

Driven by a desire to lower communication costs and to improve the quality of both transmission services and network management services, communication networks are increasingly using digital technology to transport voice, data, audio, video and other types of information to subscribers. Access networks and digital loop carrier (DLC) systems have been developed which further facilitate provision of services to subscribers. FIG. 1A depicts a conventional communication network 10 including an access network 14 coupled with a local digital switch (LDS) 12. LDS 12 may also be referred to as a central office (CO) switch and is usually a Class 4 or a Class 5 switch. LDS 12 typically performs bandwidth management and switching functions in order to provide services to subscribers 20. LDS 12 integrates access network 14 into a wider telecommunication network (not shown). Examples of LDS 12 include the 5ESS switch manufactured by Lucent, and the DMS 100 switch manufactured by Nortel.

Access network 14 is coupled with LDS 12 using communication links 16-1 and 16-2. In a specific embodiment, communication links 16-1 and 16-2 are T-1communication links which transport data using the DS-1 digital format. Several other types of communication links known in the art may also be used for communication links 16-1 and 16-2. The DS-1 format is the basic transmission format for digital communications. The DS-1 data format supports a bandwidth of 1.544 Mb/s and may be used to transport services of various types including voice, data, audio, video, and the other types of services known to those of ordinary skill in the art. Each DS-1 signal consists of 24 DS-0 channels each of which supports a bandwidth of 64 kb/s and represents a communication channel. Each DS-0 channel terminates in a network termination.

Access network 14 facilitates provision of services to subscribers 20. As shown, access network 14 comprises one or more remote terminals (RTs) 18-1, 18-2 coupled to LDS 12 via communication links 16-1 and 16-2, and coupled to subscribers 20 via subscriber links 28. The DS-0 channels of communication links 16-1 and 16-2 end at RTs 18-1 and 18-2 to form network terminations 22, while subscriber links 28 end in the RTs to form subscriber terminations 24. Each RT is responsible for establishing a communication path between LDS 12 and subscribers 20. Functions performed by each RT include demultiplexing the DS-0 channels received via the communication links, demodulating the digital signals received via communication links 16-1 and 16-2, providing connections between network terminations and subscriber terminations, and delivering services to and from subscribers 20. RTs may be placed at customer premises or in central offices.

In conventional systems like the one shown in FIG. 1A, the communication interface between LDS 12 and RTs 18-1 and 18-2 is generally based on a static bandwidth switching standard such as Bellcore's well known TR-TSY-000008 (TR-8) standard. In order to support a static switching standard such as the TR-8 standard, LDS 12 must be TR-8 compliant and RTs 18-1 and 18-2 must be equipped with interface modules which support the TR-8 interface. According to the TR-8 standard each DS-0 channel within a DS-1 is dedicated to a particular subscriber. Accordingly, in order to provide a communication path between LDS 12 and a subscriber 20, according to the TR-8 standard a DS-0 network termination 22 of a DS-0 channel is "nailed up" or dedicated to a particular subscriber termination connected to the subscriber. In effect, a dedicated one-to-one relationship or a static relationship exists between a DS-0 channel from communication links 16-1 and 16-2 and a subscriber. TR-8 compliant RTs thus provide static bandwidth allocation.

As shown in FIG. 1A, nailed up connections 26 exist between network terminations 22 and subscriber termination 24 in the RTs. The provisioning of DS-0s for each of the subscribers and the nailing up of DS-0 network terminations with subscriber terminations is performed when access network 14 is configured, usually when the network is setup for providing services to subscribers 20. Typically, a network management station (not shown) is coupled to RTs 18-1 and 18-2 to facilitate provisioning of access network 14.

Due to the static nature of the connection between a DS-0 channel network termination and a subscriber termination, the number of subscribers which can be serviced by the RTs is dependent on the number of DS-0 channels between LDs 12 and the RTs. Thus, according to the TR-8 standard, a single DS-1 signal comprising 24 DS-0s can support a maximum of 24 subscribers. In order to support additional subscribers, additional DS-1 communication lines must be leased from the communications exchange provider managing LDS 12. Thus, as shown in FIG. 1A, each RT which is connected to a DS-1 channel supports up to 24 subscribers. In order to support additional subscribers, for example subscribers 25 through 48, a second DS-1 communication link 16-2 is required. Leasing additional communication links is usually expensive and thus presents a financial obstacle for increasing the number of subscribers serviced by access network 14.

The use of static switching standards, such as the TR-8 standard, also result in under-utilization of communication links' bandwidth capacity. For example, a DS-0 which has been dedicated to a particular subscriber termination cannot be used to communicate data to another subscriber even when the subscriber to which the DS-0 channel is dedicated is not utilizing the DS-0 channel. This results in wastage of valuable bandwidth resources.

Due to the limitations inherent in static switching techniques, several new standards, for example Bellcore's TR-TSY-000303 (TR-303) standard, are being developed which allow dynamic switching between communication channels and subscribers. Dynamic switching mechanisms such as the TR-303 standard eliminate the concept of "nailed up" or dedicated connections between network terminations and subscriber terminations. In order to support a dynamic switching standard such as the TR-303 standard, LDS 12 must be TR-303 compliant and all RTs connected to the LDS must be equipped with an interface module which supports the dynamic switching or TR-303 interface.

Figure 1B:
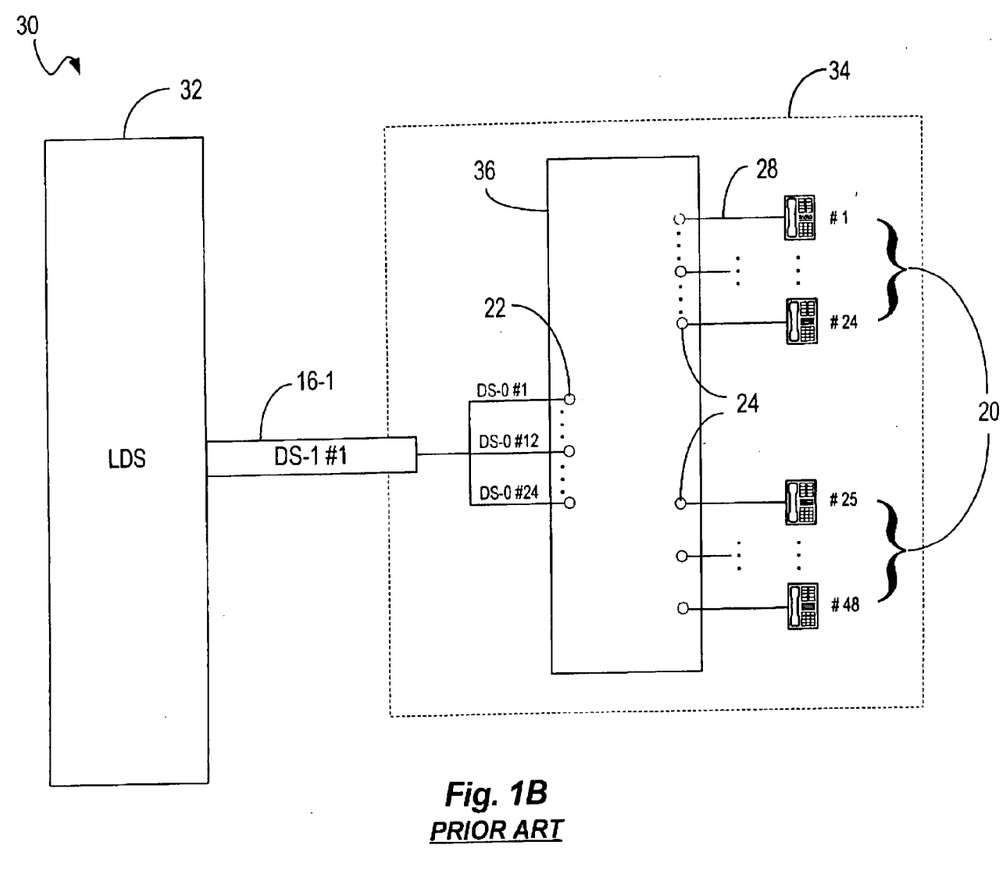
FIG. 1B depicts an access network which uses conventional dynamic switching techniques to connect subscribers to a local digital switch.

FIG. 1B depicts a communication network 30 comprising an access network 34 coupled with LDS 32 which supports a dynamic switching standard, such as the TR-303 standard. Access network 34 includes one or more RTs 36 (only one of which is shown) which support a TR-303 standard. RT 36 is connected to TR-303 compliant LDS 32 via communication link 16-1, and to subscribers 20 via subscriber links 28. RT 36 thus provides network terminations 22 for the DS-0 channels of communication link 16-1 and subscriber terminations 24 for subscriber links 28. As in FIG. 1A, communication link 16-1 is typically a T-1 link and supports the DS-1 digital format. However, unlike FIG. 1A, there are no nailed up connections between network terminations 22 and subscriber terminations 24. According to the TR-303 standard, a connection between a DS-0 network termination and a subscriber termination is made at run time when RT 36 receives a request to establish a communication path between a DS-0 channel coupled to the network termination and a subscriber connected to the subscriber termination. RT 36 may receive connection requests from a subscriber, for example when a subscriber telephone goes off-hook, or from LDS 32 requesting a connection to a particular subscriber.

In order to facilitate dynamic link switching under the TR-303 standard, each subscriber termination is assigned a unique Call Reference Value (CRV) which uniquely identifies the subscriber termination and the properties of the subscriber connected to the subscriber termination. These properties include attributes of subscriber link 28 connected to the subscriber termination, the signaling mechanism, or the loop-start or ground-start properties. CRVs are unique per TR-303 interface. CRVs are allocated for the subscriber terminations when access network 34 is provisioned, usually at network set-up time. As previously stated, a network management station (not shown) coupled with RT 36 facilitates the provisioning process. The CRV information is also forwarded to LDS 32. Thus, the CRV information is stored by RT 36 and by LDS 32 and is used to facilitate dynamic connections between LDS 32 and subscribers 20.

Upon receiving a request to connect to a particular subscriber serviced by RT 36, LDS 32 determines the CRV for the subscriber termination connected to the subscriber. LDS 32 then allocates one or more "available" DS-0 channels in the DS-1 communication link 16-1 for the connection. DS-0 channels are available if they are not currently being used for providing connections. A connection request including information regarding the allocated DS-0s and the CRV information is then forwarded to RT 36. RT 36 then provides connection between the network terminations corresponding to the DS-0s allocated by LDS 32 and the subscriber termination identified by the CRV information. In this manner, the connection between the network terminations and the subscriber termination is provided dynamically during run time. The DS-0 channels allocated by LDS 32 for the connection may be reused when the present connection has been terminated.

Connection requests may also be initiated by subscribers 20. When a particular subscriber requests a connection, RT 36 intercepts the connection request and determines the CRV information for the subscriber termination connected to the requesting subscriber. The CRV information is sent to LDS 32 which allocates one or more available DS-0s for the connection. RT 36 then dynamically provides a connection between the network terminations of the allocated DS-0 channels and the requesting subscriber termination.

Using dynamic switching standards such as the TR-303 standard, the number of subscribers 20 supported by a RT may exceed the number of DS-0 channels connected to the RT 36, since not all the subscribers are connected at the same time. This is a substantial improvement over the TR-8 wherein the number of subscribers supported by an RT is limited by the number of DS-0 channels connected to the RT. As shown in FIG. 1B, using a TR-303 compliant LDS and an RT 36 which supports the TR-303 standard, more than 24 subscribers may be supported using a single DS-1 communication link 16-1. This is an improvement over access network 14 shown in FIG. 1A wherein only a maximum of 24 subscribers could be supported using a single DS-1 channel. In general, by using a dynamic switching standard such as the TR-303 standard, "subscriber concentration" may be provided wherein the number of subscribers supported by an RT is greater than the number of DS-0 channels connected to the RT. Dynamic switching also promotes efficient utilization of bandwidth resources since it allows for reuse of available DS-0 channels to connect to the subscriber terminations.

Although dynamic switching standards, such as the TR-303 standard, alleviate many of the limitations associated with static switching standards, they have not been readily adopted by the service providers. This is due to the fact that a majority of the RTs, such as D-4 channel banks, which are currently in use and which have been installed by the service providers at significant costs support only the older TR-8 static standard and not the new TR-303 dynamic standard. For most service providers it would be cost prohibitive and not feasible to replace existing TR-8 compliant infrastructure with a TR-303 compliant infrastructure. Consequently, a majority of the existing access networks cannot enjoy benefits offered by dynamic switching techniques.

Accordingly, there is a need for a system and method which allows communication networks supporting static switching techniques only to enjoy the advantages provided by dynamic switching techniques. It is desired that existing TR-8 compliant systems be able to take advantage of the dynamic switching techniques provided by the TR-303 standard in a cost effective manner. It is also desired that the dynamic switching capability be provided without replacing or substantially modifying the existing networks supporting static switching standards in order to minimize the costs associated with replacing network equipment.

SUMMARY OF THE INVENTION

According to the invention, a system and method provide dynamic switching functionality in an access network which supports only static switching. The present invention uses dynamic switching techniques to provide communication channels between a local digital switch and subscribers of the access network who are connected to remote terminals which support only static switching.

According to one aspect of the present invention, the dynamic switching functionality is provided by a dynamic switching subsystem which is coupled with the local digital switch via a first communication link and coupled with a remote terminal via a second communication link. The dynamic switching subsystem provides a first set of network terminations for communication channels within the first communication link and a second set of network terminations for communication channels within the second communication link. The remote terminal provides a third set of network terminations for communication channels received from the dynamic switching subsystem and subscriber terminations for subscribers connected to the remote terminal. Since the remote terminal supports only static switching, nailed up connections are provided between the third network terminations and the subscriber terminations. According to the present invention, dynamic switching functionality is provided by performing dynamic switching between the first set of network terminations and the second set of network terminations when connection requests are received by the dynamic switching subsystem.

According to another aspect of the present invention, to facilitate dynamic switching between the first set of network terminations and the second set of network terminations, network termination call reference values are assigned to each of the second set of network terminations. The network termination call reference values uniquely identify communication channels from the dynamic switching subsystem to the remote terminal and which are nailed up by the remote terminal to the subscriber terminations. The dynamic switching subsystem uses the network termination call reference values to provide dynamic connections between the first set of network terminations and the second set of network terminations.

According to still another aspect of the present invention, a network management station may be provided to facilitate provisioning of the access network, including assigning network termination call reference values to the second set of network terminations. The network management station may also be configured to provide nailed up connections between the third set of network terminations and the subscriber terminations in the remote terminals.

The dynamic switching techniques of the present invention enable access networks to enjoy benefits offered by dynamic switching techniques without replacing existing static switching components and without incurring substantial replacement costs. The present invention allows access networks to provide "subscriber concentration" whereby the number of subscribers serviced by the access network may exceed the number of communication channels leased from the local digital switch to the access network.

The invention will be better understood by reference to the following detailed description and accompanying figures.

DESCRIPTION OF THE SPECIFIC EMBODIMENTS

Figure 2:
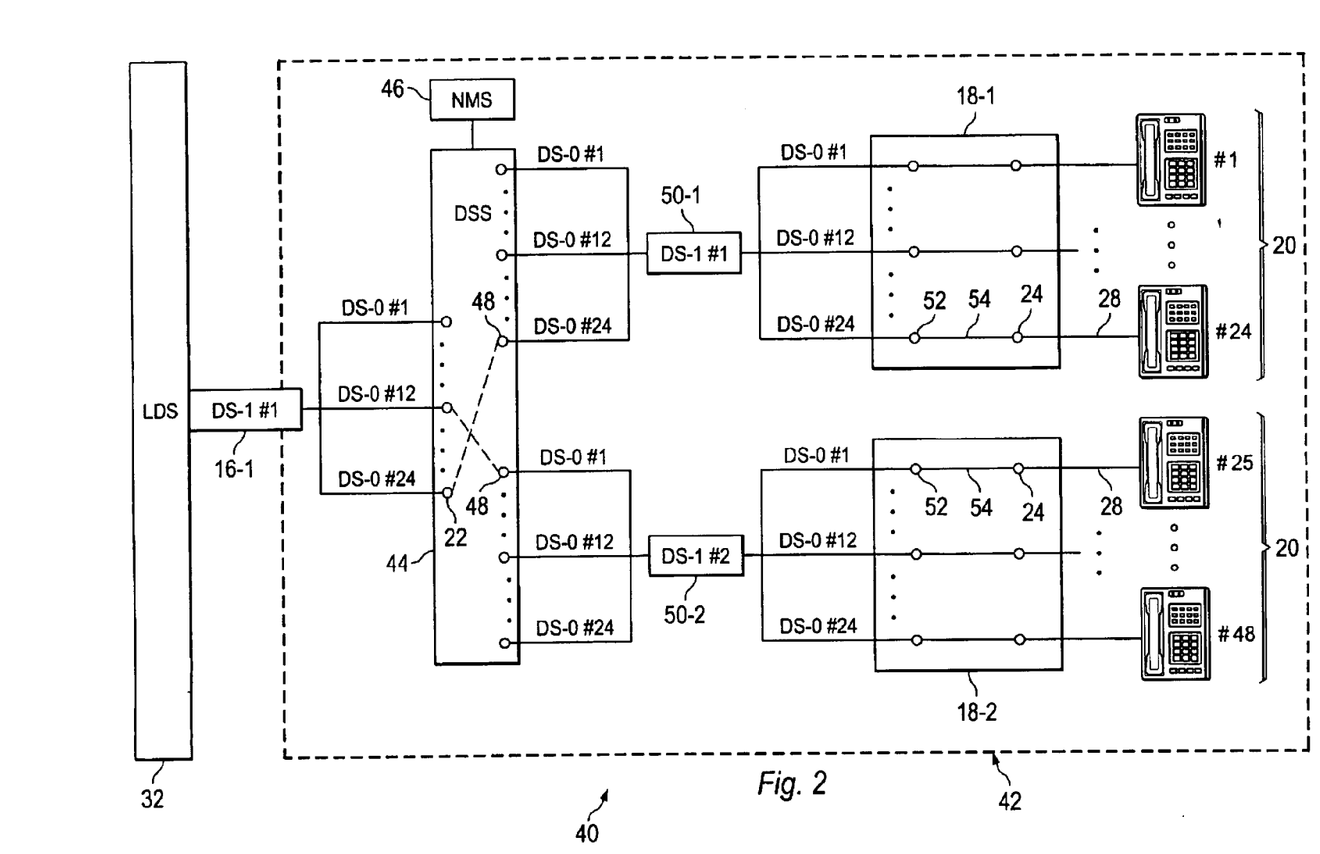
FIG. 2 depicts an access network incorporating an embodiment of the present invention wherein dynamic switching functionality is provided for a network which supports static switching.

FIG. 2 depicts a communication network 40 comprising an access network 42 incorporating an embodiment of the present invention coupled with LDS 32 which supports a dynamic switching standard such as the TR-303 standard. As shown, access network 42 comprises a dynamic switching subsystem (DSS) 44 coupled to LDS 32 via communication link 16-1, one or more RTs 18-1 and 18-2 coupled with DSS 44 using communication links 50-1 and 50-2 respectively, and a network management station (NMS) 46 coupled with DSS 44. NMS 46 facilitates provisioning of access network 42. RTs 18-1 and 18-2 are also coupled with subscribers 20 via subscriber links 28. Communication links 16-1, 50-1, and 50-2 generally support the DS-1 digital communication format. In a specific embodiment T-1 links are used for the communication links, however other types of communication links known to those of ordinary skill in the art may also be used. Although only one DSS 44 is shown in FIG. 2, it should be apparent that a plurality of DSSs may be connected to LDS 32. Similarly, one or more RTs may be connected to each DSS either directly (as shown in FIG. 2) or indirectly via other network components. Examples of DSS 44 include B-32 switches manufactured by Fibex Systems of Petaluma, Calif.

As described above with respect to FIG. 1B, LDS 32 supports a dynamic switching standard, for example the TR-303 standard. RTs 18-1 and 18-2 are similar to the RTs shown in FIG. 1A and provide network terminations 52 for DS-0 channels of communication links 50-1 and 50-2 and subscriber terminations 24 for subscriber links 28. RTs 18-1 and 18-2 include interface modules which support only a static switching interface between network terminations 52 and subscriber terminations 24. In a specific embodiment, RTs 18-1 and 18-2 support the TR-8 standard. Thus, as shown in FIG. 2, RTs 18-1 and 18-2 provide nailed up connections 54 between network terminations 52 and subscriber terminations 24. Since each subscriber requires a nailed up dedicated DS-0 channel allocated to it, the number of subscriber supported by each RT is equal to or less than the number of incoming DS-0 channels connected to the RT.

DSS 44 is responsible for providing dynamic switching functionality for access network 42 and may be located at a customer site along with the RTs or in a central office. As shown, DSS 44 is coupled with LDS 32 via communication link 16-1 and with RTs 18-1 and 18-2 using communication links 50-1 and 50-2 respectively. DSS 44 provides DS-0 network terminations 22 for communication link 16-1 and DS-0 network terminations 48 for communication links 50-1 and 50-2. Further, DSS 44 includes interface modules which support a dynamic switching interface between DS-0 network terminations 22 and DS-0 network terminations 48. This is however substantially different from the TR-303 standard. Unlike the TR-303 standard which provides dynamic switching between DS-0 network terminations and subscriber terminations, DSS 44 according to the present invention provides dynamic switching between DS-0 network terminations.

The dynamic switching technique provided by the present invention enables access network 42 to support a number of subscribers which may be greater than the total number of DS-0 channels contained in DS-1 communication link 16-1 leased from the communication exchange provider. Thus, access network 42 may provide subscriber concentration even though the individual RTs do not support dynamic switching. As shown in FIG. 2, more than 24 subscribers may be supported using a single DS-1 link 16-1 and leased from the LDS exchange provider. Access network 42 is thus able to reap the benefits of dynamic switching systems without replacing existing static switching components and without incurring substantial costs. Although access network 42 is depicted as having a specific configuration as shown in FIG. 1B, the specific configuration is not meant to limit the scope of the present invention. It should be apparent to one of ordinary skill in the art that access network 42 may have varying configurations including one or more DSSs, and one or more RTs connected to each other and to the LDS using one or more communication channels. Further, one or more DS-0 channels of a DS-1 signal may be used as an Embedded Operations Channel (EOC) or as a Timeslot Management channel (TMC).

DSS 44 accomplishes dynamic switching between network terminations by assigning unique values to each of DS-0 network terminations 48. These unique values are called network termination CRVs (NT-CRVs). Each NT-CRV uniquely identifies a DS-0 channel between DSS 44 and a RT. NT-CRVs are usually allocated by NMS 46 when access network 42 is configured or provisioned. DSS 44 stores mapping information which maps a NT-CRV to a particular DS-0 channel network termination. In a specific embodiment, this mapping is stored in the form of a table on DSS 44. Since NT-CRVs are assigned to network terminations and not subscriber terminations, they are different from CRVs, as defined by the TR-303 standard, which are assigned to subscriber terminations. Further details on the allocation and use of NT-CRVs is given below.

NMS 46 coupled to DSS 44 facilitates provisioning of access network 42 to support dynamic switching. Functions performed by NMS 46 include but are not restricted to provisioning dedicated "nailed up" connections between network terminations 52 and subscriber terminations 24, allocating NT-CRVs for DS-0 network terminations 48, communicating the provisioning information, including the NT-CRV information to LDS 32, monitoring and logging alarms or errors raised within the network, and other network management functions.

Figure 3:
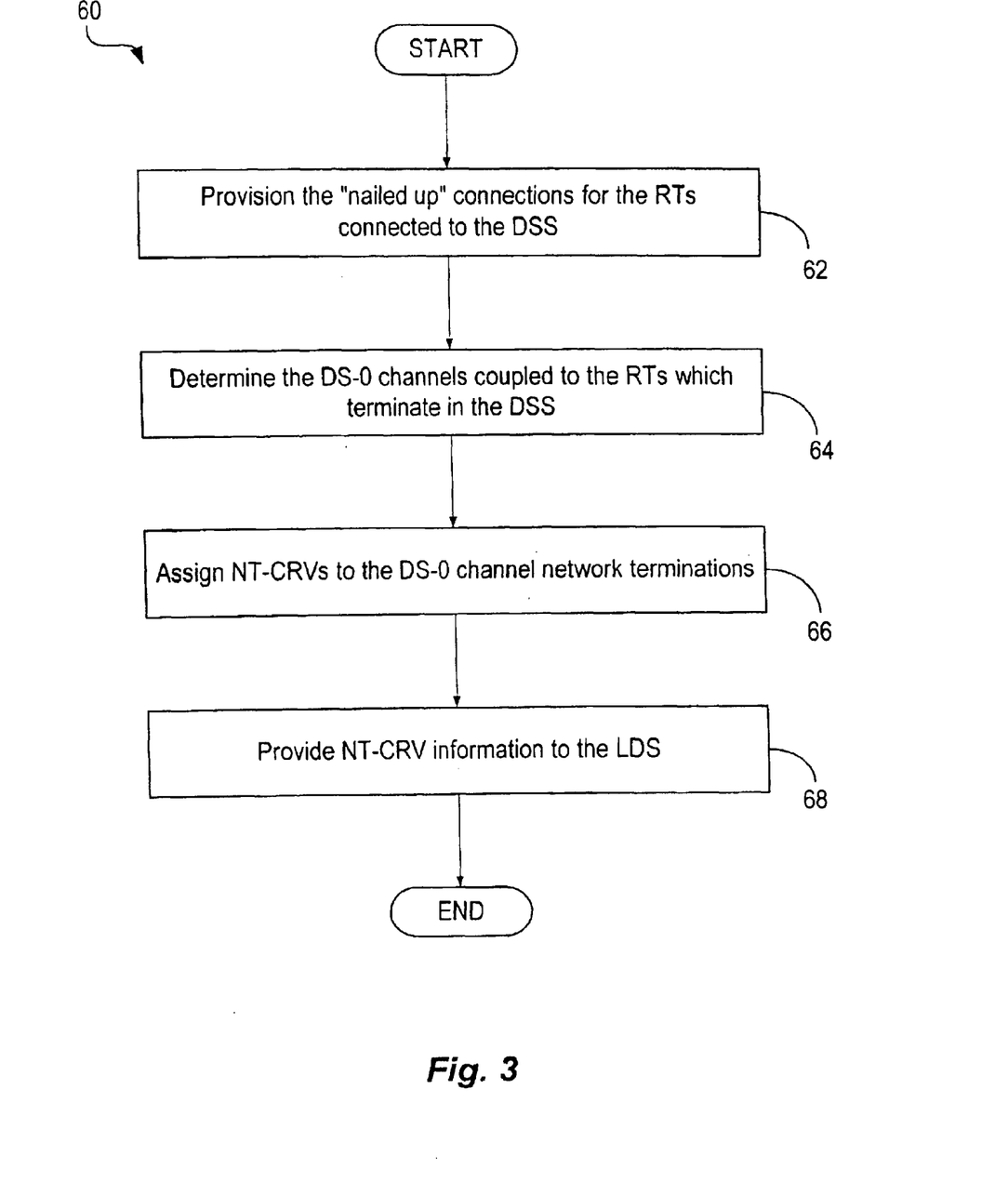
FIG. 3 depicts a flowchart showing steps performed by a network management station for provisioning a particular dynamic switching subsystem according to an embodiment of the present invention.

FIG. 3 is a flowchart 60 depicting steps performed by NMS 46 for provisioning a particular DSS within access network 42 to support dynamic switching. Flowchart 60 is generally initiated when NMS 46 receives a network configuration request from the network administrator. Upon receiving the configuration request, NMS 46 provisions the "nailed up" connections 54 between network terminations 52 and subscriber terminations 24 for all RTs connected to the DSS (step 62). Next, NMS 46 determines the number of DS-0s connected to the DSS and which have been "nailed up" to subscriber terminations 24 (step 64). NMS 46 assigns a unique NT-CRV to each network termination 48 corresponding to the nailed up DS-0 channels (step 66). The mapping between NT-CRVs and the DS-0 channel network terminations is usually stored in the DSS. Alternatively, the mapping information may also be stored by NMS 46. The DSS or NMS 46 then provides the NT-CRV information to LDS 32 either directly or indirectly via other network components (step 68). In this manner, the NT-CRV information is stored both by the DSS and LDS 32. LDS 32 treats the NT-CRVs just as regular CRVs and is oblivious to the fact that the NT-CRV identifies a unique DS-0 channel network termination and not a subscriber termination. The significance and meaning of a NT-CRV is known only by DSS 44. The functioning of LDS 32 is thus not affected by the NT-CRVs. The steps of flowchart 60 may be repeated by NMS 46 for other DSSs within access network 42.

Figure 4:
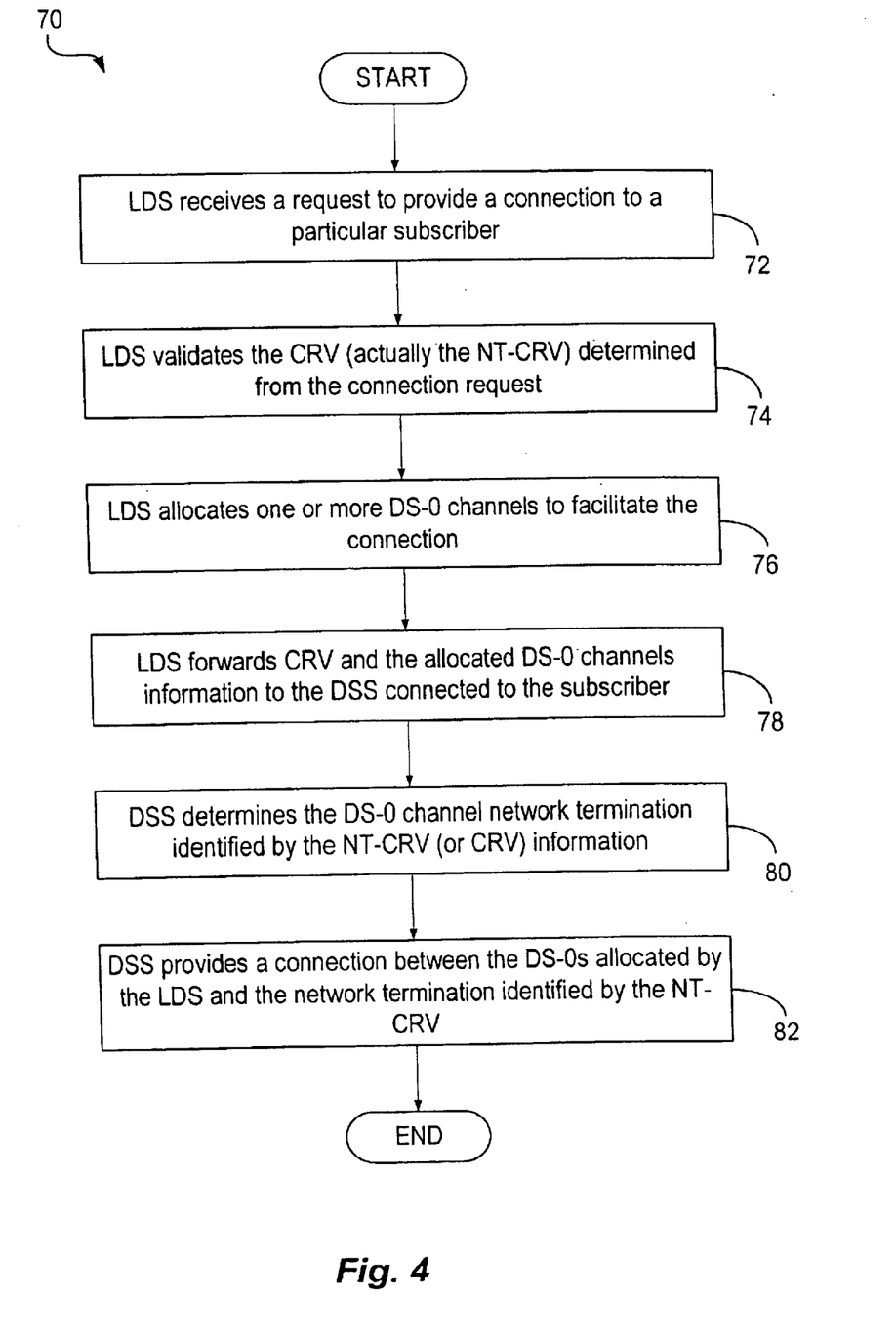
FIG. 4 depicts a flowchart showing steps performed by a local digital switch and a dynamic switching subsystem when the local digital switch requests a connection to a subscriber serviced by the dynamic switching subsystem, according to an embodiment of the present invention.
Figure 5:
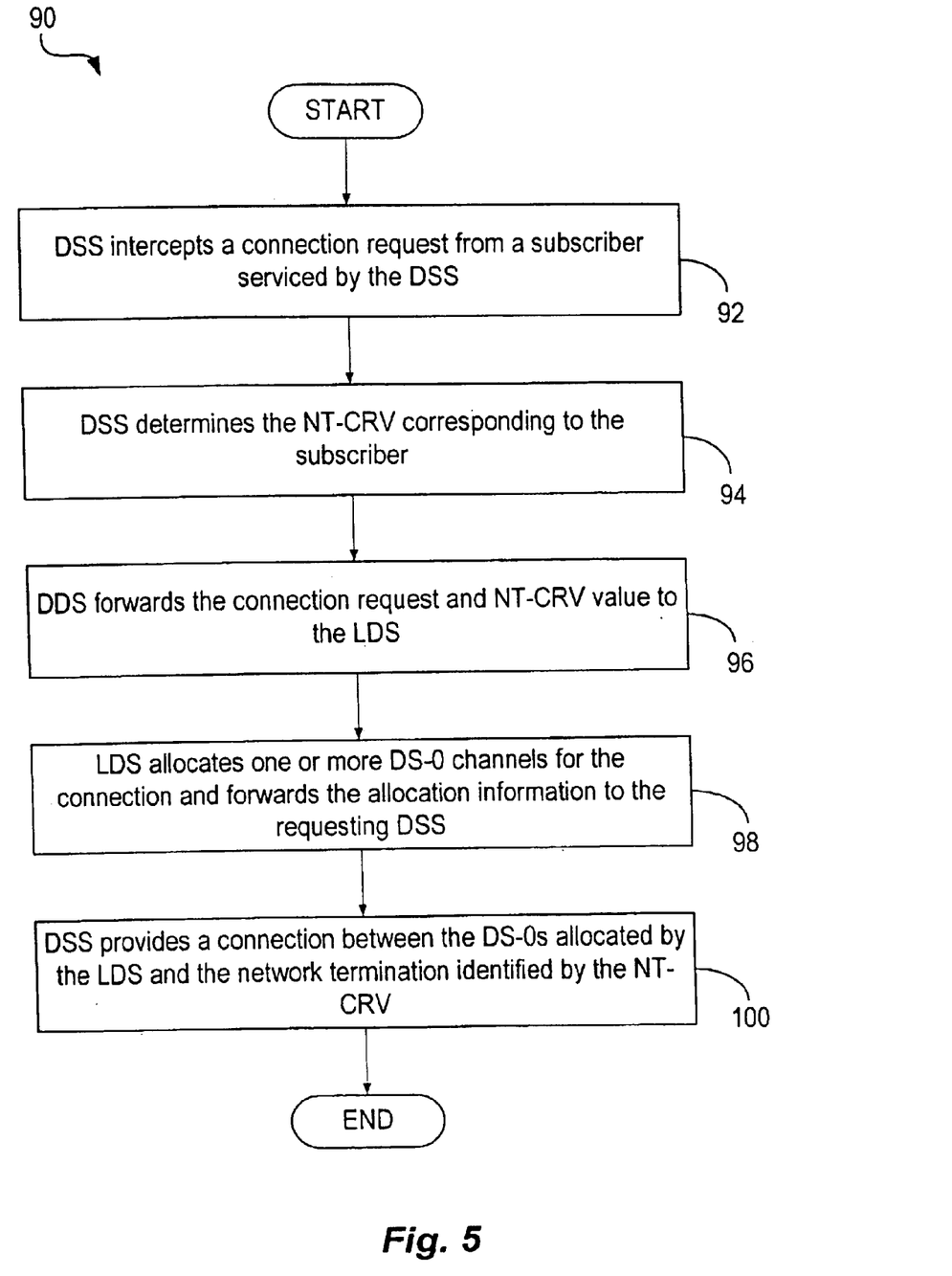
FIG. 5 depicts a flowchart showing steps performed by a local digital switch and a dynamic switching subsystem when a connection to the local digital switch is requested by a subscriber connected to the dynamic switching subsystem, according to an embodiment of the present invention.

FIGS. 4 and 5 are flowcharts depicting steps performed by an LDS and a DSS for providing a connection from the LDS to a particular subscriber serviced by a RT coupled with the DSS. FIG. 4 depicts a flowchart 70 showing steps performed by LDS 32 and DSS 44 when LDS 32 requests a connection to a particular subscriber serviced by a RT coupled with DSS 44. The flowchart is initiated when LDS 32 receives a request to provide a connection to a particular subscriber. The connection request typically includes information which allows LDS 32 to determine the CRV identifying the subscriber (step 72). LDS 32 then verifies the validity of the CRV (step 74). The CRV is considered valid if the CRV value is stored on LDS 32. The CRV actually represents a NT-CRV, however, since the LDS cannot differentiate between a CRV and a NT-CRV, the LDS believes that the CRV uniquely identifies the subscriber termination to which a connection is to be established. If the CRV is valid, LDS 32 allocates one or more available DS-0 channels from communication link 16-1 to facilitate the connection (step 76). LDS 32 sends a connection request along with the CRV and channel allocation information to the DSS which services the subscriber to which the connection is to be established (step 78).

On receiving the connection request, DSS 44 accesses the NT-CRV to DS-0 channel network termination mapping stored on the DSS to determine the DS-0 channel network termination which is uniquely identified by the NT-CRV received from LDS 32 (step 80). DSS 44 then provisions a connection between the network terminations of the DS-0 channels allocated by LDS 32 and the network termination identified by the NT-CRV (step 82). Thus, a communication path is established between LDS 32 and the particular subscriber. For example, as shown in FIG. 2, assuming that DSS 44 receives a request to provide a connection to subscriber #25 and assuming that DS-0 #12 of communication link 16-1 is allocated by LDS 32 for the connection, DSS 44 provides a connection between the DS-0 #12 network termination 22 and the DS-0 #1 network termination 48 of communication link 50-2 which is nailed up to the subscriber termination connected to subscriber #25. In this manner connection services are provided to the destination subscriber. After a call or connection request to a particular subscriber has been completed, the DS-0s assigned for that connection are made available and may be reused to facilitate another connection. In this manner the present invention facilitates reuse of available DS-0s resulting in efficient use of available bandwidth resources.

FIG. 5 depicts a flowchart 90 showing steps performed by LDS 32 and DSS 44 when a connection is requested by a subscriber connected to a RT coupled with DSS 44. For example, such a request may be received when a telephone subscriber goes off-hook. When a subscriber goes off-hook, DSS 44 connected to the RT servicing the off-hook subscriber intercepts the connection request (step 92). DSS 44 then determines the NT-CRV corresponding to the DS-0 which is nailed up to the subscriber termination connected to the requesting subscriber (step 94). DSS 44 then sends a connection request to LDS 32 which includes the NT-CRV information (step 96). LDS 32 then allocates one or more available DS-0 channels on communication link 16-1 for the connection and sends the DS-0 channel allocation information to the requesting DSS 44 (step 98). If no DS-0 channels are available on communication link 16-1, then LDS 32 sends a busy signal to DSS 44. On receiving the DS-0 channel allocation information from LDS 32, DSS 44 dynamically provides a connection between network terminations 22 connected to the DS-0 channels allocated by LDS 32 and the DS-0 channel network termination 48 identified by the NT-CRV and which is connected to the DS-0 channel which is nailed up to the requesting subscriber termination (step 100).

For example, as shown in FIG. 2, assuming that subscriber #24 requests a connection and DS-0 #24 is allocated by LDS 32 for the connection, DSS 44 provides a connection between network termination 22 of DS-0 #24 of communication link 16-1 and network termination 48 of DS-0 #24 of communication link 50-1 which is nailed up to the subscriber termination 24 connected to subscriber #24. In this manner connection services are provided for the requesting subscriber. The LDS may also use the NT-CRV information for subscriber billing purposes. As previously stated, after a call or connection has been completed, the allocated DS-0s assigned for that connection are made available and may be reused to facilitate another connection. This facilitates reuse of available DS-0s resulting in efficient use of available bandwidth resources.

Figure 6:
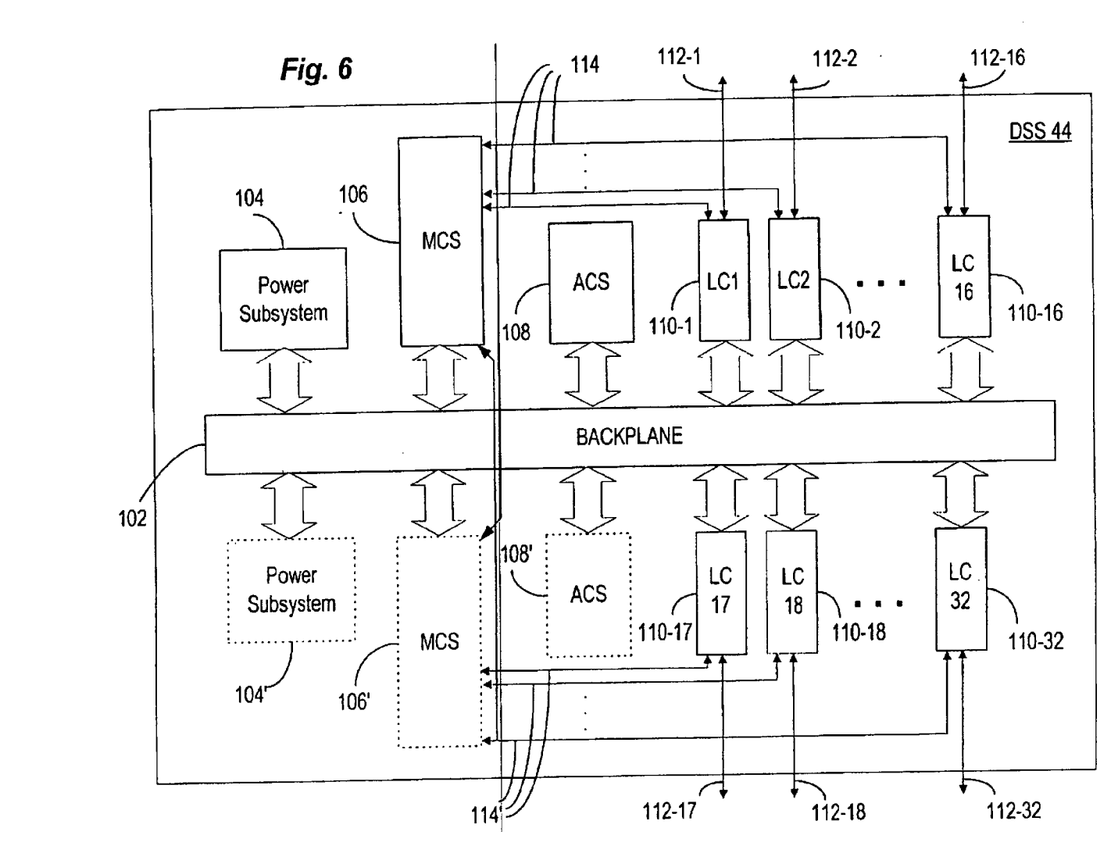
FIG. 6 depicts a dynamic switching subsystem according to an embodiment of the present invention.

FIG. 6 depicts an embodiment of DSS 44 which facilitates dynamic switching between network terminations according to an embodiment of the present invention. As shown in FIG. 6, DSS 44 comprises a plurality of components and subsystems connected to a backplane 102. Backplane 102 provides a mechanism for letting the various components and subsystems of DSS 44 communicate with each other as intended. The subsystems may include a power subsystem 104, a main controller subsystem (MCS) 106, an advanced controller subsystem (ACS) 108, and a plurality of line cards (LCs) 110-1 through 110-16. In a specific embodiment, a redundant set of subsystems 104', 106', and 108' may also be provided to back up the primary subsystems. An additional set of line cards 110-17 through 110-32 may also be provided to increase the bandwidth capacity of DSS 44. When a redundant set of subsystems is provided, each line card is directly coupled both to primary MCS 106 and to redundant MCS 106'.

Power subsystem 104 provides power to the subsystems of DSS 44. MCS 106 is responsible for executing functions which provide the dynamic switching functionality of DSS 44. MCS 106 may also be configured to perform various other switching and bandwidth management services for access network 42. ACS 108 is responsible for providing advanced network related functions such as supporting high capacity ATM switches which may support bandwidths in excess of 10 Gigabit, supporting frame relay switches and IP switching.

In a specific embodiment, line cards 110-1 through 110-16 (and 110-17 through 110-32 of the additional LCs) may be configured to couple DSS 44 to other network components via links 112-1 through 112-32. These network components may include other NMSs, DSSs, LDSs, RTs, or even subscribers. Depending on their connections, a line card may represent a network termination or a subscriber termination. In a specific embodiment, each line card is directly coupled to MCS 106 via connections 114. In embodiments which support redundant subsystems, the line cards may be coupled to both primary MCS 106 and to the redundant MCS 106' via connections 114 and 114'. A line card link may either carry incoming traffic from external network components to DSS 44 (ingress), or may alternatively carry outgoing network traffic from DSS 44 to external network components (egress). Connections 114 facilitate the transfer of incoming network traffic from the line cards to MCS 106, and transfer of outgoing traffic from MCS 106 to external network components after switching and bandwidth management has been performed by MCS 106.

Figure 7:
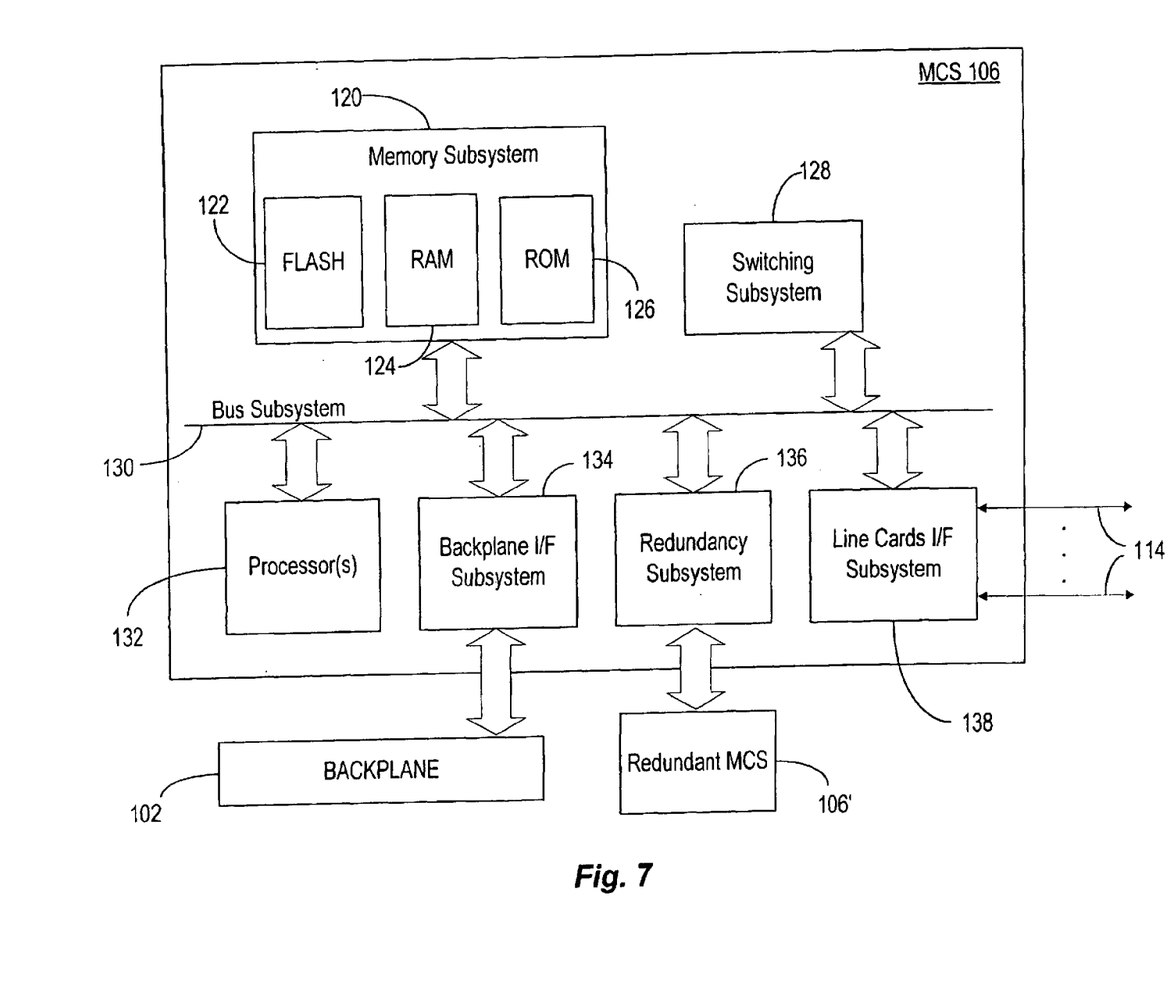
FIG. 7 depicts an embodiment of a main controller subsystem which is included in a dynamic switching subsystem according to an embodiment of the present invention.

FIG. 7 illustrates a specific embodiment of MCS 106. As previously stated, MCS 106 is responsible for executing functions which provide the dynamic switching functionality of DSS 44. In a specific embodiment, MCS 106 includes an interface module which enables DSS 44 to support TR-303 standard services. As shown in FIG. 7, MCS 106 includes at least one processor 132 which communicates with a number of peripheral subsystems via bus subsystem 130. These peripheral subsystems typically include a memory subsystem 120, a switching subsystem 128, a line cards interface subsystem 138, a backplane interface subsystem 134, and optionally a redundancy subsystem 136.

Bus subsystem 130 provides a mechanism for letting the various components and subsystems of MCS 106 communicate with each other as intended. Although bus subsystem 130 is shown schematically as a single bus in FIG. 7, alternate bus systems having a number of buses such as a local bus and one or more expansion buses as well as serial and parallel ports are also included within the scope of the present invention.

Memory subsystem 120 stores the various data constructs and programming modules that provide the functionality of MCS 106. Memory subsystem 120 may include a number of memories including a main random access memory (RAM) 124 for storage of instructions and data during program execution, a read only memory (ROM) 126 in which fixed instructions are stored, and a FLASH memory 122 which stores a mirror image of the various programming module images and databases stored in RAM 124. FLASH memory 122 thus provides persistent storage for the contents of RAM 124 and prevents RAM contents from being lost due to loss of power to RAM 124. In a specific embodiment, a background process initiated by MCS 106 copies contents of RAM 124 to FLASH memory 122 while a foreground process continues to perform processing based on the contents of RAM 124. Memory subsystem 120 provides memory resources for storing provisioning information when access network 42 is configured by NMS 46. Provisioning information includes the NT-CRV to network termination mapping which is used by MCS 106 to provide dynamic switching functionality. Memory subsystem 120 may also store other information such as the availability of DS-0s on communication link 16-1, attributes of subscribers serviced by the DSS, and the current connections between network terminations 22 and network terminations 48.

Switching subsystem 128 in conjunction with processor 132 is responsible for performing various functions which provide the static and dynamic switching functionality of DSS 44. Examples of functions performed by a DSS are shown in flowcharts 70 and 90 of FIGS. 4 and 5.

Line cards interface subsystem 138 provides linkage for each of the line card links 112-1 through 112-32 via connections 114. MCS 106 receives incoming network traffic via these links, performs switching of the incoming network traffic, and transfers the network traffic to outgoing links for transportation to other components of the network.

Backplane interface subsystem 134 provides a mechanism for connecting MCS 106 to backplane 102. Backplane interface subsystem 134 may also be configured to handle communication of information/signals between MCS 106 and the other subsystems of DSS 44 via backplane 102.

In embodiments of the DSS which include redundant subsystems, a redundancy subsystem 136 is provided for interfacing primary MCS 106 with redundant MCS 106'. Redundancy subsystem 136 may be configured to manage switch-over operations from primary MCS 106 to redundant MCS 106' when primary MCS 106 is disabled.

While the present invention has been described using a particular combination of hardware and software, it should be recognized that other combinations of hardware and software are also within the scope of the present invention. For example, the functions performed by the NMS and the DSS may be performed by software modules executed by processors in the NMS and DSS, respectively. Alternatively, the present invention may be implemented only in hardware or only in software, or a combination of hardware and software or in combinations with other hardware and software elements. For example, the functionality provided by a NMS may be integrated into the DSS.

Although specific embodiments of the invention have been described, various modifications, alterations, alternative constructions, and equivalents are also encompassed within the scope of this invention. For example, the described invention is not restricted to operation within certain specified computer environments, but is free to operate within a plurality of computer environments. Additionally, although the present invention has been described using a particular series of transactions between the various network components, it should be apparent to those skilled in the art that the scope of the present invention is not limited to the described series of transactions.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A system for connecting a local digital switch to a subscriber, the system comprising:
   a switching subsystem;
   a first set of communication channels coupling the switching subsystem with the local digital switch;
   a second set of communication channels coupling the switching subsystem with a remote terminal, wherein a plurality of subscribers is coupled with the remote terminal via subscriber links, the subscriber links including a specific subscriber link connected to the subscriber to be connected to the local digital switch; and
   a network management subsystem coupled with the switching subsystem and configured to assign call reference values to each communication channel of the second set of communication channels, the call reference values uniquely identifying each communication channel of the second set communication channels;
   wherein the remote terminal is configured to provide dedicated connections between the subscriber links and second set of communication channels; and
   wherein the switching subsystem is configured to receive a specific call reference value and a specific communication channel from the first set of communication channels, the specific call reference value identifying a specific communication channel from the second set of communication channels which is nailed up to the specific subscriber link, the switching subsystem is configured to connect the subscriber to the local digital switch by providing a connection between the specific communication channel from the first set of communication channels and the specific communication channel from the second set of communication channels;
   wherein a subset of subscribers of the plurality of subscribers is greater than a subset of communication channels of the first set of communication channels.

2. A system for connecting a local digital switch to a subscriber, the system comprising:
   a switching subsystem;
   a first set of communication channels coupling the switching subsystem with the local digital switch;
   a second set of communication channels coupling the switching subsystem with a remote terminal, wherein a plurality of subscribers is coupled with the remote terminal via subscriber links, the subscriber links including a specific subscriber link connected to the subscriber to be connected to the local digital switch; and
   a network management subsystem coupled with the switching subsystem and configured to assign call reference values to each communication channel of the second set of communication channels, the call reference values uniquely identifying each communication channel of the second set communication channels;
   wherein the remote terminal is configured to provide dedicated connections between the subscriber links and second set of communication channels; and
   wherein the switching subsystem is configured to receive a specific call reference value and a specific communication channel from the first set of communication channels, the specific call reference value identifying a specific communication channel from the second set of communication channels which is nailed up to the specific subscriber link, the switching subsystem is configured to connect the subscriber to the local digital switch by providing a connection between the specific communication channel from the first set of communication channels and the specific communication channel from the second set of communication channels;
   wherein the local digital switch is TR-303 compliant and the remote terminal is TR-8 compliant and is configured to provide dedicated connections between the second set of communication channels and the subscriber links according to TR-8 standard.

3. A system for connecting a local digital switch to a subscriber, the system comprising:
   a first communication link including a plurality of communication channels;
   a switching subsystem coupled with the local digital switch via the first communication link;
   first network terminations coupling the plurality of communication channels of the first communication link with the switching subsystem;
   a second communication link including a plurality of communication channels and operable to couple a remote terminal to the switching subsystem;
   second network terminations coupling the plurality of communication channels of the second communication link with the switching subsystem;
   third network terminations coupling the plurality of communication channels of the second communication link with the remote terminal, wherein a plurality of subscribers is coupled with the remote terminal via subscriber links;

subscriber terminations coupling the subscriber links with the remote terminal, the subscriber terminations including a specific subscriber termination connected to the subscriber to be connected to the local digital switch; and a network management subsystem coupled with the switching subsystem and configured to assign network termination call reference values to the second network terminations, the network termination call reference values uniquely identifying each communication channel of the plurality of communication channels in the second communication link;

wherein the remote terminal is configured to provide dedicated connections between the third network terminations and the subscriber terminations; and wherein the switching subsystem is configured to receive a specific network termination call reference value and a specific communication channel from the plurality of communication channels included in the first communication link, the specific communication channel coupled with the switching subsystem via a specific first network termination, the specific network termination call reference value corresponding to a specific second network termination connected to a communication channel from the second communication link which is connected to the remote terminal via a specific third network termination which is dedicated to the specific subscriber termination, the switching subsystem is configured to connect the subscriber to the local digital switch by providing a connection between the specific first network termination and the specific second network termination;

wherein a subset of subscriber terminations exceeds a subset of first network terminations.

4. A system for connecting a local digital switch to a subscriber, the system comprising:

a first communication link including a plurality of communication channels;

a switching subsystem coupled with the local digital switch via the first communication link;

first network terminations coupling the plurality of communication channels of the first communication link with the switching subsystem;

a second communication link including a plurality of communication channels, wherein a remote terminal is coupled with the switching subsystem via the second communication link;

second network terminations coupling the plurality of communication channels of the second communication link with the switching subsystem;

third network terminations coupling the plurality of communication channels of the second communication link with the remote terminal;

a plurality of subscribers coupled with the remote terminal via subscriber links;

subscriber terminations coupling the subscriber links with the remote terminal, the subscriber terminations including a specific subscriber termination connected to the subscriber to be connected to the local digital switch; and a network management subsystem coupled with the switching subsystem and configured to assign network termination call reference values to the second network terminations, the network termination call reference values uniquely identifying each communication channel of the plurality of communication channels in the second communication link;

wherein the remote terminal is configured to provide dedicated connections between the third network terminations and the subscriber terminations; and wherein the switching subsystem is configured to receive a specific network termination call reference value and a specific communication channel from the plurality of communication channels included in the first communication link, the specific communication channel coupled with the switching subsystem via a specific first network termination, the specific network termination call reference value corresponding to a specific second network termination connected to a communication channel from the second communication link which is connected to the remote terminal via a specific third network termination which is dedicated to the specific subscriber termination, the switching subsystem is configured to connect the subscriber to the local digital switch by providing a connection between the specific first network termination and the specific second network termination;

wherein the local digital switch is TR-303 compliant and the remote terminal TR-8 compliant and the remote terminal is configured to provide the dedicated connections between the third network terminations and the subscriber terminations according to the TR-8 standard.

5. A method of connecting a local digital switch to a subscriber, the method comprising:

coupling a switching subsystem with the local digital switch via a first set of communication channels;

coupling a remote terminal with the switching subsystem via a second set of communication channels;

coupling a plurality of subscribers with the remote terminal via subscriber links, the subscriber links including a specific subscriber link connected to the subscriber to be connected to the local digital switch;

providing dedicated connections between the subscriber links and the second set of communication channels at the remote terminal;

assigning call reference values to each of the communication channels in the second set of communication channels, the call reference values uniquely identifying each communication channel of the second set of communication channels;

receiving at the switching subsystem a specific call reference value and a specific communication channel from the first set of communication channels, the specific call reference value identifying a specific communication channel from the second set of communication channels which is dedicated to the specific subscriber link; and connecting the specific communication channel from the first set of communication channels to the specific communication channel from the second set of communication channels;

wherein the number of subscribers in the plurality of subscribers is greater than the number of communication channels in the first set of communication channels.

6. A method of connecting a local digital switch to a subscriber, the method comprising:

coupling a switching subsystem with the local digital switch via a first set of communication channels;

coupling a remote terminal with the switching subsystem via a second set of communication channels;

coupling a plurality of subscribers with the remote terminal via subscriber links, the subscriber links including a specific subscriber link connected to the subscriber to be connected to the local digital switch;

providing dedicated connections between the subscriber links and the second set of communication channels at the remote terminal;

assigning call reference values to each of the communication channels in the second set of communication channels, the call reference values uniquely identifying each communication channel of the second set of communication channels;

receiving at the switching subsystem a specific call reference value and a specific communication channel from the first set of communication channels, the specific call reference value identifying a specific communication channel from the second set of communication channels which is dedicated to the specific subscriber link; and connecting the specific communication channel from the first set of communication channels to the specific communication channel from the second set of communication channels;

wherein the local digital switch is TR-303 compliant and the remote terminal is TR-8 compliant and providing dedicated connections between the second set of communication channels and the subscriber links is done according to the TR-8 standard.

7. A method of connecting a local digital switch to a subscriber, the method comprising:

coupling a switching subsystem with the local digital switch via a first communication link, the first communication link including a plurality of communication channels;

coupling the plurality of communication channels in the first communication link with the switching subsystem via first network terminations;

coupling a remote terminal with the switching subsystem via a second communication link, the second communication link including a plurality of communication channels;

coupling the plurality of communication channels in the second communication link with the switching subsystem via second network terminations;

coupling the plurality of communication channels in the second communication link with the remote terminal via third network terminations;

coupling a plurality of subscribers with the remote terminal via subscriber links;

coupling the subscriber links with the remote terminal via subscriber terminations, the subscriber terminations including a specific subscriber termination connected to the subscriber to be connected to the local digital switch;

providing dedicated connections between the third network terminations and the subscriber terminations at the remote terminal;

assigning network termination call reference values to the second network terminations, the network termination call reference values uniquely identifying each communication channel of the plurality of communication channels in the second communication link;

receiving at the switching subsystem a specific network termination call reference value and a specific communication channel from the plurality of communication channels included in the first communication link, the specific communication channel coupled to the switching subsystem via a specific first network termination, the specific network termination call reference value corresponding to a specific second network termination connected to a communication channel from the second communication link which is connected to the remote terminal via a specific third network termination which is dedicated to the specific subscriber termination; and connecting, at the switching subsystem, the specific first network termination and the specific second network termination;

wherein a subset of subscriber terminations exceeds a subset of first network terminations.

8. A method of connecting a local digital switch to a subscriber, the method comprising:

coupling a switching subsystem with the local digital switch via a first communication link, the first communication link including a plurality of communication channels;

coupling the plurality of communication channels in the first communication link with the switching subsystem via first network terminations;

coupling a remote terminal with the switching subsystem via a second communication link, the second communication link including a plurality of communication channels;

coupling the plurality of communication channels in the second communication link with the switching subsystem via second network terminations;

coupling the plurality of communication channels in the second communication link with the remote terminal via third network terminations;

coupling a plurality of subscribers with the remote terminal via subscriber links;

coupling the subscriber links with the remote terminal via subscriber terminations, the subscriber terminations including a specific subscriber termination connected to the subscriber to be connected to the local digital switch;

providing dedicated connections between the third network terminations and the subscriber terminations at the remote terminal;

assigning network termination call reference values to the second network terminations, the network termination call reference values uniquely identifying each communication channel of the plurality of communication channels in the second communication link;

receiving at the switching subsystem a specific network termination call reference value and a specific communication channel from the plurality of communication channels included in the first communication link, the specific communication channel coupled to the switching subsystem via a specific first network termination, the specific network termination call reference value corresponding to a specific second network termination connected to a communication channel from the second communication link which is connected to the remote terminal via a specific third network termination which is dedicated to the specific subscriber termination; and connecting, at the switching subsystem, the specific first network termination and the specific second network termination;

wherein the local digital switch is TR-303 compliant and the remote terminal is TR-8 compliant and providing dedicated connections comprises providing connections according to the TR-8 standard.

* * * * *